United States Patent [19]
Lam

[11] Patent Number: 5,900,684
[45] Date of Patent: May 4, 1999

[54] POWER SUPPLY SYSTEM FOR FAILSAFE SUPPLY OF DIFFERENT DC VOLTAGES

[75] Inventor: Phillip Lam, Mission Viejo, Calif.

[73] Assignee: AM Group, Corporation, Irvine, Calif.

[21] Appl. No.: 09/059,979

[22] Filed: Apr. 14, 1998

[51] Int. Cl.[6] ................................. H01R 13/70
[52] U.S. Cl. ................ 307/139; 324/508; 439/43; 439/638; 200/51.05; 200/518; 363/146
[58] Field of Search ................... 307/112, 139, 307/28, 72; 361/785; 324/508; 439/188, 43, 638; 363/146; 200/51.05, 51.09, 518; 395/288

[56] References Cited

U.S. PATENT DOCUMENTS

| | | | |
|---|---|---|---|
| 3,928,737 | 12/1975 | Prasert | 200/51.05 |
| 4,093,336 | 6/1978 | Rose | 200/51.09 |
| 5,259,776 | 11/1993 | Giroux | 439/43 |
| 5,309,121 | 5/1994 | Kobayashi et al. | 439/638 |
| 5,563,782 | 10/1996 | Chen et al. | 363/146 |
| 5,668,419 | 9/1997 | Oktay | 395/284 |

*Primary Examiner*—Albert W. Paladini
*Attorney, Agent, or Firm*—Herbert M. Shapiro

[57] ABSTRACT

Power supplies which include sockets for supplying DC voltages as well as cables for supplying DC voltages to internal components of, for example, a computer are configured to prevent a user from connecting to an inappropriate DC voltage. The apparatus includes a special multiple din socket which provides a different voltage at each din of a subset of the dins, only one din of which is alive at a time. The apparatus includes a switch at each socket operative to select only a single din of a subset of dins at that socket. The illustrative apparatus includes several sockets, each one of which includes a different subset of dins selected by a switch, a single din at a time.

14 Claims, 2 Drawing Sheets

POWER SUPPLY SYSTEM FOR FAILSAFE SUPPLY OF DIFFERENT DC VOLTAGES

FIELD OF THE INVENTION

This invention relates to power supplies and power strips capable of supplying several DC voltages.

BACKGROUND OF THE INVENTION

Copending application Ser. No. 08/789,841, now U.S. Pat. No. 5,777,397, filed Jan. 29, 1997, and application Ser. No. 08/734,959 filed Oct. 23, 1996, now U.S. Pat. No. 5,753,979, both assigned to the assignee of the present application, disclose a power supply having cables for supplying DC voltages to internal components of electronic systems such as a computer. These applications also disclose that the internal power supply includes sockets on the housing thereof for direct power supply to peripherals to the computer in the absence of connections to a house supply and the attending adapters. Similarly, copending application Ser. No. 08/994,908, filed Dec. 19, 1997 and also assigned to the assignee of the present application, discloses a power strip also includes sockets to provide a plurality of DC voltages. The use of such systems requires the user to know what voltage his peripheral requires and which socket is to be used. An incorrect connection could lead to damage to the peripheral.

BRIEF DESCRIPTION OF THE INVENTION

In accordance with the principles of this invention, each DC socket in the power supply or the power strip of the apparatus of any of the above-identified applications is configured to include a like set of dins. Further, power (DC) is connected to a different subset of dins for each socket. For a female set of dins at the power supply apparatus, a cable having a mating set of pins at each end thereof is supplied. The cable is color coded to match the color of a corresponding socket. Further, a switch is connected to each socket to select, for example, one out of four possible voltages out of a din set of, for example, ten din. By activating only a different four dins (a single one at a time) out of a possible ten and by color coding, erroneous interconnections are forestalled.

The cable and the sockets are notched to permit mating only when properly aligned. An adapter also is provided having a mating female connector set at one end to mate with the cable. The adapter includes, at its other end, a two-terminal concentric coupler for connection to peripherals which require such a connection.

DETAILED DESCRIPTION OF ILLUSTRATIVE EMBODIMENTS OF THIS INVENTION

Figure 1:
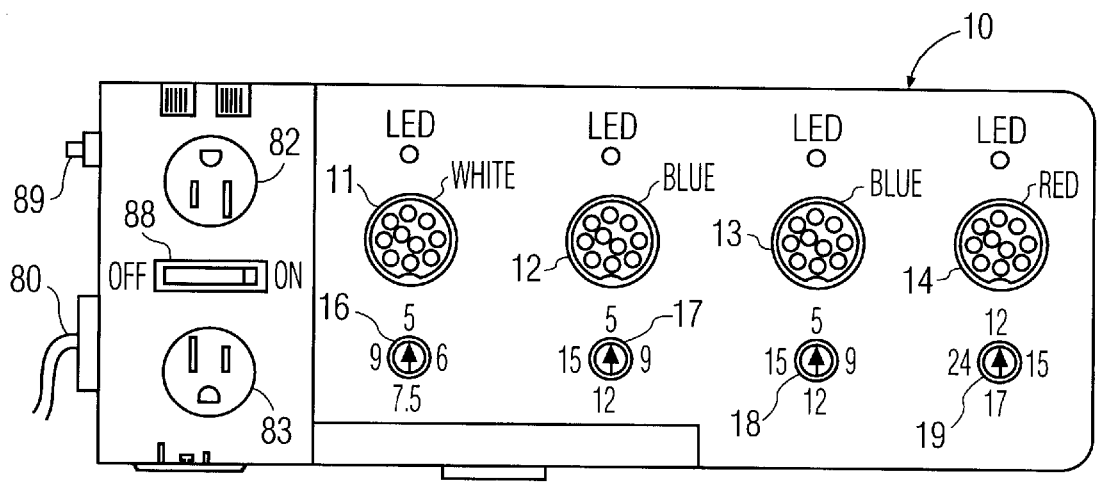
FIGS 1 and 2 are top and side views of a power strip in accordance with the principles of this invention.
Figure 2:
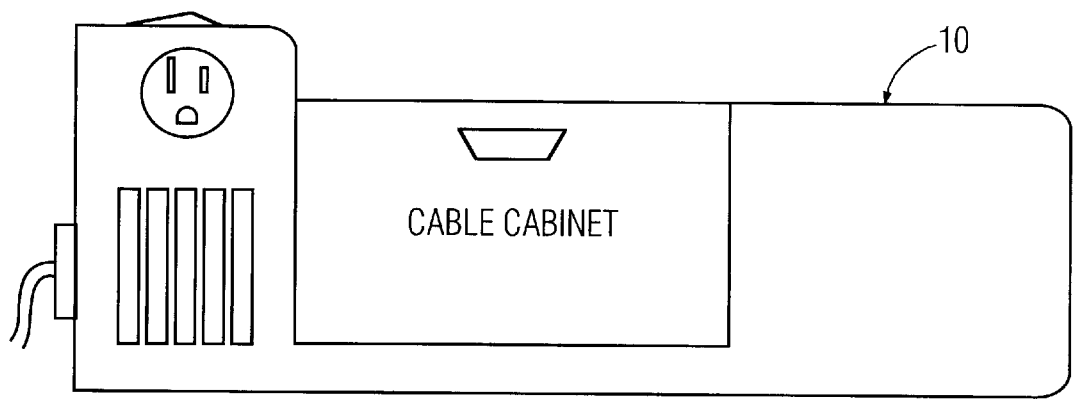

FIGS. 1 and 2 are top and side views of a power strip 10. The power strip includes, illustratively, four sockets 11, 12, 12, and 14 labeled white, blue, blue and red, respectively. Each socket includes a ten din set, illustratively, of a female construction.

Each of the sockets has a switch associated with it, switches 16, 17, 18 and 19 for sockets 11, 12, 13 and 14, respectively. Switch 16 selects one of DC voltages 5V, 6V, 7.5V or 9V as shown. The DC voltages selected by each of the switches are noted at the periphery of each switch. Note that a different subset of four din (out of ten) can be activated (one at a time) for each socket. Thus, switch 18 can select only one voltage from a subset of 5V, 9V, 12V, and 15V whereas switch 19 can select only one (at a time) from a subset of 12V, 15V, 17V, and 24V, the dins in the subset for each socket are different.

The pin assignment for socket 11, 12, 13, and 14 are shown in Table I.

TABLE I

| ROTARY SWITCH | | | | | |
|---|---|---|---|---|---|
| Din Jack 1 White | | Din Jack 2 Blue | | Din Jack 3 Red | |
| Pin | Signal | Pin | Signal | Pin | Signal |
| 1 | RTN | 1 | RTN | 1 | RTN |
| 2 | 5 V | 2 | 5 V | 2 | |
| 3 | 6 V | 3 | | 3 | |
| 4 | 7.5 V | 4 | | 4 | |
| 5 | 9 V | 5 | 9 V | 5 | |
| 6 | | 6 | 12 V | 6 | 12 V |
| 7 | | 7 | 15 V | 7 | |
| 8 | | 8 | | 8 | 17 V |
| 9 | | 9 | | 9 | 20 V |
| 10 | | 10 | | 10 | 24 V |

The power source requirements for maximum output current per socket and minimum, maximum output voltage and maximum output ripple are shown in table II.

TABLE II

| Condition | Limit | Option | Units |
|---|---|---|---|
| Maximum output current per socket | 1.5 | 5A | Amp |
| Minimum output voltage | 5.0 | | Vdc |
| Maximum output voltage | 24 | 40 | Vdc |
| Maximum output ripple | 100 | | mV p-p |

Figure 3:
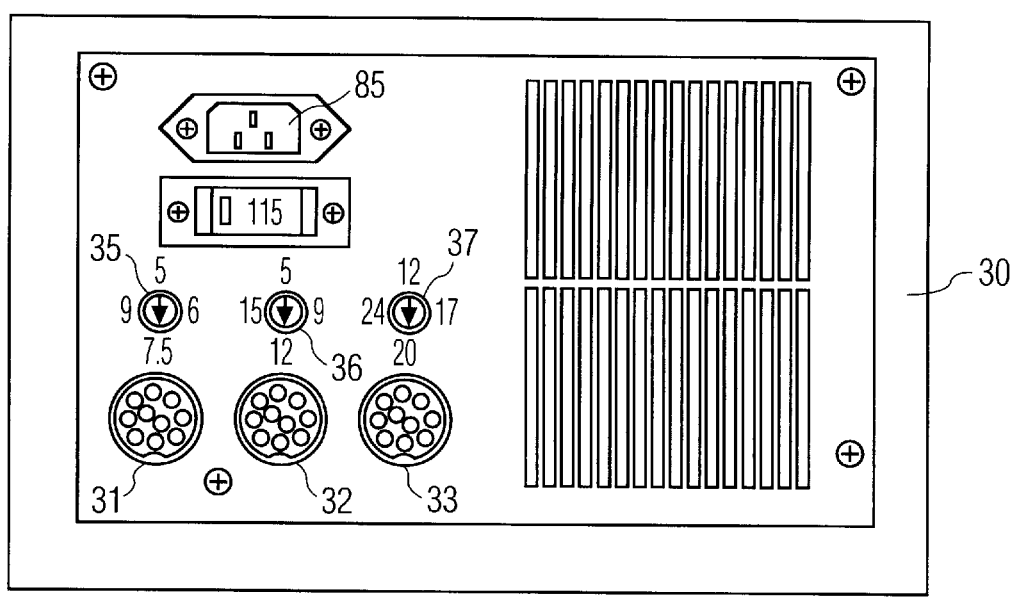
FIG. 3 is a side view of a power supply in accordance with the principles of this invention.

FIG. 3 shows the side of a power supply 30 which would, for example, be exposed at the rear of a computer. The power supply includes three sockets 31, 32, and 33 with associated switches 35, 36, and 37 respectively. As stated above, each socket, illustratively, has a set of ten dins and each switch is operative to select a single voltage out of a subset of four voltages where the subset is different for each socket.

Figure 4:
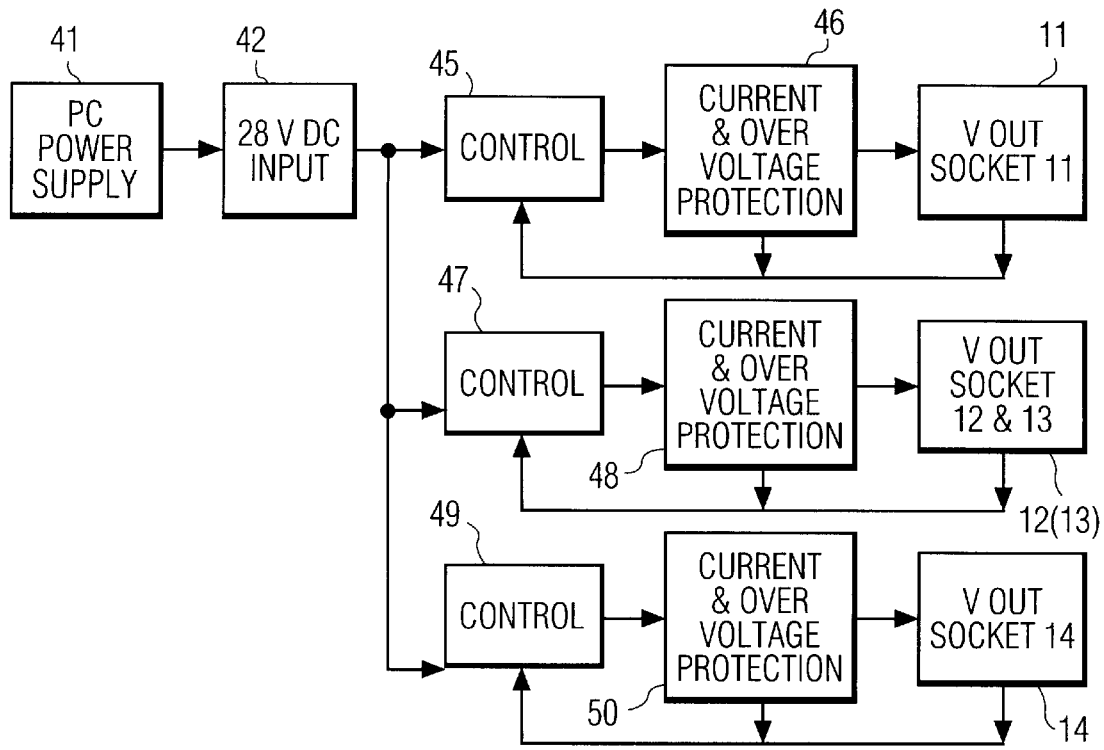
FIG. 4 is a block diagram of the DC network for supplying DC power to the sockets of the apparatus of FIGS. 1 and 3.

FIG. 4 is a block diagram of the resistor network and control for the sockets of FIGS. 1 or 3. The power supply (internal) is indicated by block 41. The supply provides, illustratively, a 28 Volt DC input as indicated by block 42. The network includes a control circuit as well as a current and over voltage protection circuit for each of the sockets. The control and protection circuits are designated 45 and 46 for socket 11, 47 and 48 for socket(s) 12 (13), and 49 and 50 for socket 14.

Figure 5:
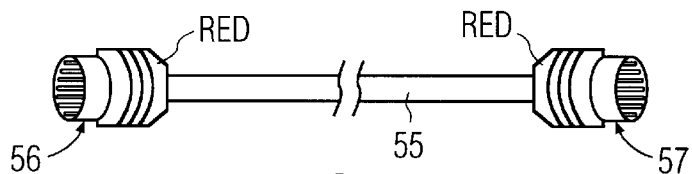
FIG. 5 is a schematic representation of an extension cable for the apparatus of FIGS. 1 and 3.
Figure 6:
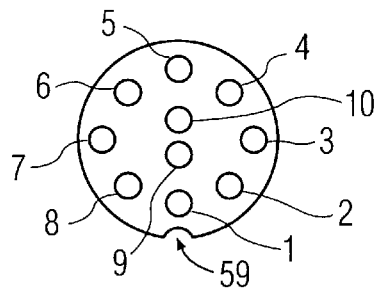
FIG. 6 is a schematic representation of the din set for a socket of the apparatus of FIGS. 1 and 3.

FIG. 5 shows an extension cable 55 having a pin pattern of ten pins to mate with the din (assumed female) pattern of each socket of the apparatus of FIGS. 1 or 3. The plug at each end of the cable has a notch 56 and 57, to ensure proper alignment of the plug and socket. FIG. 6 is an enlarged view of a socket (or pin arrangement) showing notch 59. The dins in this figure are numbered 1 through 10 to correspond to the pin notation in Table I. The cable is conveniently color coded to match the color of the corresponding socket. Thus, because of the arrangement to select only a single din from a different subset of a set of dins and by matching the socket and cable and by color coding, a user cannot make a mistake which could damage a peripheral.

Figure 7:
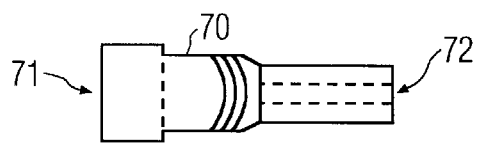
FIG. 7 is a schematic representation of an adapter for connection to the extension cable of FIG. 5.

Some peripherals require a two terminal concentric connector with the outer terminal being ground. FIG. 7 shows one suitable adapter 70 having an end 71 which appears as shown in FIG. 6 and an end 72 which has the two terminal concentric connector. Table III shows the adapter pin assignment.

TABLE III

| | Adapter | | | | | | | | |
|---|---|---|---|---|---|---|---|---|---|
| Pin | 5 V | 6 V | 7.5 V | 9 V | 12 V | 15 V | 17 V | 20 V | 24 V |
| 1 | RTN | RTN | RTN | RTN | RTN | RTN | RTN | RTN | RTN |
| 2 | 5 V | 0 | 0 | 0 | 0 | 0 | 0 | 0 | 0 |
| 3 | 0 | 6 V | 0 | 0 | 0 | 0 | 0 | 0 | 0 |
| 5 | 0 | 0 | 7.5 V | 0 | 0 | 0 | 0 | 0 | 0 |
| 5 | 0 | 0 | 0 | 9 V | 0 | 0 | 0 | 0 | 0 |
| 5 | 0 | 0 | 0 | 0 | 12 V | 0 | 0 | 0 | 0 |
| 7 | 0 | 0 | 0 | 0 | 0 | 15 V | 0 | 0 | 0 |
| 8 | 0 | 0 | 0 | 0 | 0 | 0 | 17 V | 0 | 0 |
| 9 | 0 | 0 | 0 | 0 | 0 | 0 | 0 | 20 V | 0 |
| 10 | 0 | 0 | 0 | 0 | 0 | 0 | 0 | 0 | 24 V |

It is clear from Table III that the adapter pin 4 corresponds to 7.5 Volts and adapter pin 6 corresponds to 12 volts. The adapter mates with one end of the extension cable of FIG. 5.

The apparatus of FIG. 1, or FIG. 3, includes a connection to an AC source. This is shown at 80 in FIG. 1. Further, the power strip of FIG. 1 is shown as having two AC plugs 82 and 83. The apparatus of FIG. 3 also has an AC plug 85. The on-off switch 88 and reset switch 89 of FIG. 1 are standard features of a power strip.

What has been described is merely illustrative of the invention. It is clear that a din set of more (or less) than ten may be employed and that subsets different than four, as illustrated, may be used. It is only important that power is supplied to a different subset at each socket and that the switch associated with each socket can select only one voltage from that subset. Further, it is important that the socket and cable are aligned and that a mechanism such as the notch shown be provided to prevent the possibility of misalignment. The color coding too provides a convenient prompt for the user (or sales person) to use the correct cable and the corresponding socket for the peripheral of choice.

Further, although the invention has been described in terms of AC power input, a DC source of power can be used as well as should be clear to one skilled in the art. Also, a cable as shown in FIG. 5 need only have a number of wires equal to the number of dins in a subset. Thus, in the illustrative embodiment, a cable only has four wires even though the plug and socket, each, has ten dins. A ten wire cable could be used, at increased cost, to provide a universal cable for all the sockets of, for example, the embodiment of FIG. 1. If the cable only includes four wires, a different cable is required for each socket because the pattern of the subset of potentially active dins is positioned (i.e. oriented) differently with respect to the notch (i.e. 59 of FIG. 6). In embodiments where fewer conductors are used than the number of dins in a plug, the cables are conveniently color coded to match the color at the socket.

What is claimed is:

1. Power supply apparatus having a cable for connection to a source of power, said apparatus having a housing, at least one socket in said housing, said socket having a set of dins therein, said apparatus including means for providing a different DC voltage at each din of a subset of said set, said apparatus including a switch for selecting only a single din of said subset.

2. Apparatus as in claim 1 also including a cable having first and second ends, each of said ends having a plug with a like din arrangement for mating with a socket of said apparatus.

3. Apparatus as in claim 1 wherein said din pattern is a female pattern.

4. Apparatus as in claim 1, also including an adapter having first and second ends, said first end having a din pattern for mating with said socket, said second end having first and second concentric electrode connections.

5. Apparatus as in claim 1 having a plurality of sockets, each having a like set of dins and a different subset of dins for supplying different voltage level sets, each of said sockets having a switch, each of said switches being user responsive to select a single din of the subset of dins in the associated socket.

6. Apparatus as in claim 5, also including a cable having first and second ends, each of said ends having a plug with a like din arrangement for mating with one of said sockets.

7. Apparatus for supplying DC power to a plurality of sockets, said apparatus having a cable for connection to a source of power, said apparatus having a housing, said sockets being mounted on said housing, each of said sockets including a set of dins, said apparatus including means for providing a different DC voltage at each of a subset of said set of dins in each of said sockets, said apparatus also including a switch for each of said sockets, each of said switches being user responsive for selecting only a single din of subset of dins in the associated socket.

8. Apparatus as in claim 7 also including a plurality of cables extending through said housing for connection to internal components of a system.

9. Apparatus as in claim 7 wherein said dins are female.

10. Apparatus as in claim 9 wherein said first and second ends are male.

11. Apparatus as in claim 7 also including a cable having first and second ends, each of said ends having a plug with a like din arrangement for mating with one of said sockets.

12. Apparatus as in claim 9 wherein said sockets and said cables are color coded.

13. Apparatus as in claim 9 wherein said cable includes a number of conductors equal to the number of dins in the subset of dins in a socket, each of said conductors being connected between corresponding dins of the plug at the first and second ends of a cable, each of said plugs including a notch for aligning the connected dins of the plug of a cable with the active dins of a socket.

14. Apparatus as in claim 13 wherein the dins connected by said conductors in each of said cables are arranged in different orientations with respect to said notch.

* * * * *